United States Patent [19]

Henits et al.

[11] Patent Number: 5,339,203

[45] Date of Patent: Aug. 16, 1994

[54] APPARATUS AND METHOD OF RETRIEVING A MESSAGE FROM A DIGITAL AUDIO TAPE

[75] Inventors: John Henits, Bethel; Robert B. Swick, Stratford, both of Conn.

[73] Assignee: Dictaphone Corporation, Stratford, Conn.

[21] Appl. No.: 171,290

[22] Filed: Dec. 21, 1993

[51] Int. Cl.⁵ .................. G11B 5/19; G11B 5/00; G11B 15/18
[52] U.S. Cl. ..................... 360/39; 360/72.1; 360/32
[58] Field of Search ............ 360/5, 6, 12, 32, 39, 360/48, 49, 53, 72.1, 72.2, 72.3; 379/79, 80, 93, 81; 369/53, 59

[56] References Cited

U.S. PATENT DOCUMENTS

| | | | |
|---|---|---|---|
| 4,692,819 | 9/1987 | Steele | 360/72.1 |
| 4,841,387 | 6/1989 | Rindguss | 360/72.1 |
| 4,989,104 | 1/1991 | Schukin et al. | 360/72.1 |
| 5,091,635 | 2/1992 | Akatsuka et al. | 369/59 X |
| 5,148,418 | 9/1992 | Tsurushima | 369/50 X |
| 5,218,590 | 6/1993 | Miyasaka | 369/54 |
| 5,270,877 | 12/1993 | Fukushima et al. | 360/53 X |

*Primary Examiner*—Donald Hajec
*Assistant Examiner*—Thien Minh Le
*Attorney, Agent, or Firm*—Peter Vrahotes; Melvin J. Scolnick

[57] ABSTRACT

A scheme has been devised for retrieving audio from a digital audio tape (DAT) that has been used in a device such as a digital audio logger wherein audio is recorded on a intermittent basis. An audio bit map is created on the DAT that represents a record of activity with a "1" bit representing audio and a "0" bit representing absence of audio. The channels of the logger can be searched for a next message or previous message. A predetermined sequence of "1's" and "0's" are used in the search for identifying a message.

20 Claims, 4 Drawing Sheets

| 40 — CHANNEL VOICE BITS | | | 38 | | | | 42 — TIME REPRESENTATION (SEC) | |
|---|---|---|---|---|---|---|---|---|
| 32 | 31 | | 4 | 3 | 2 | 1 | START | END |
| 0 | 0 | - - - - | 0 | 1 | 1 | 0 | 0 | 1.2 |
| 0 | 0 | - - - - | 1 | 1 | 1 | 0 | 1.2 | 2.4 |
| 0 | 1 | - - - - | 1 | 1 | 1 | 1 | 2.4 | 3.6 |
| 1 | 0 | - - - - | 0 | 0 | 1 | 1 | 3.6 | 4.8 |
| ⋮ | | | | | | | ⋮ | |
| 1 | 1 | - - - - | 1 | 0 | 1 | 1 | n | n + 1.2 |
| 0 | 1 | - - - - | 1 | 0 | 0 | 1 | n + 1.2 | n + 2.4 |

FIG. 2
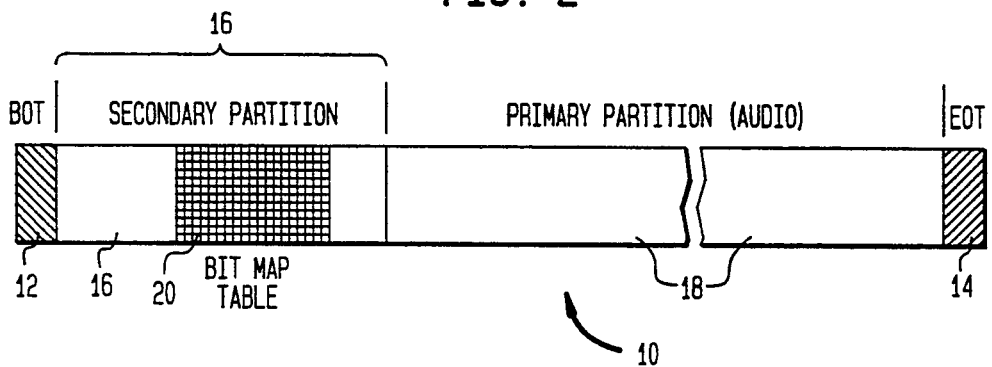
FIG. 4
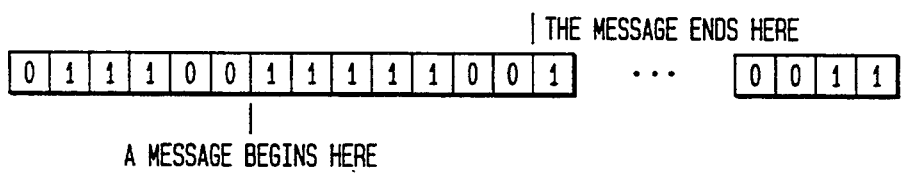
FIG. 5

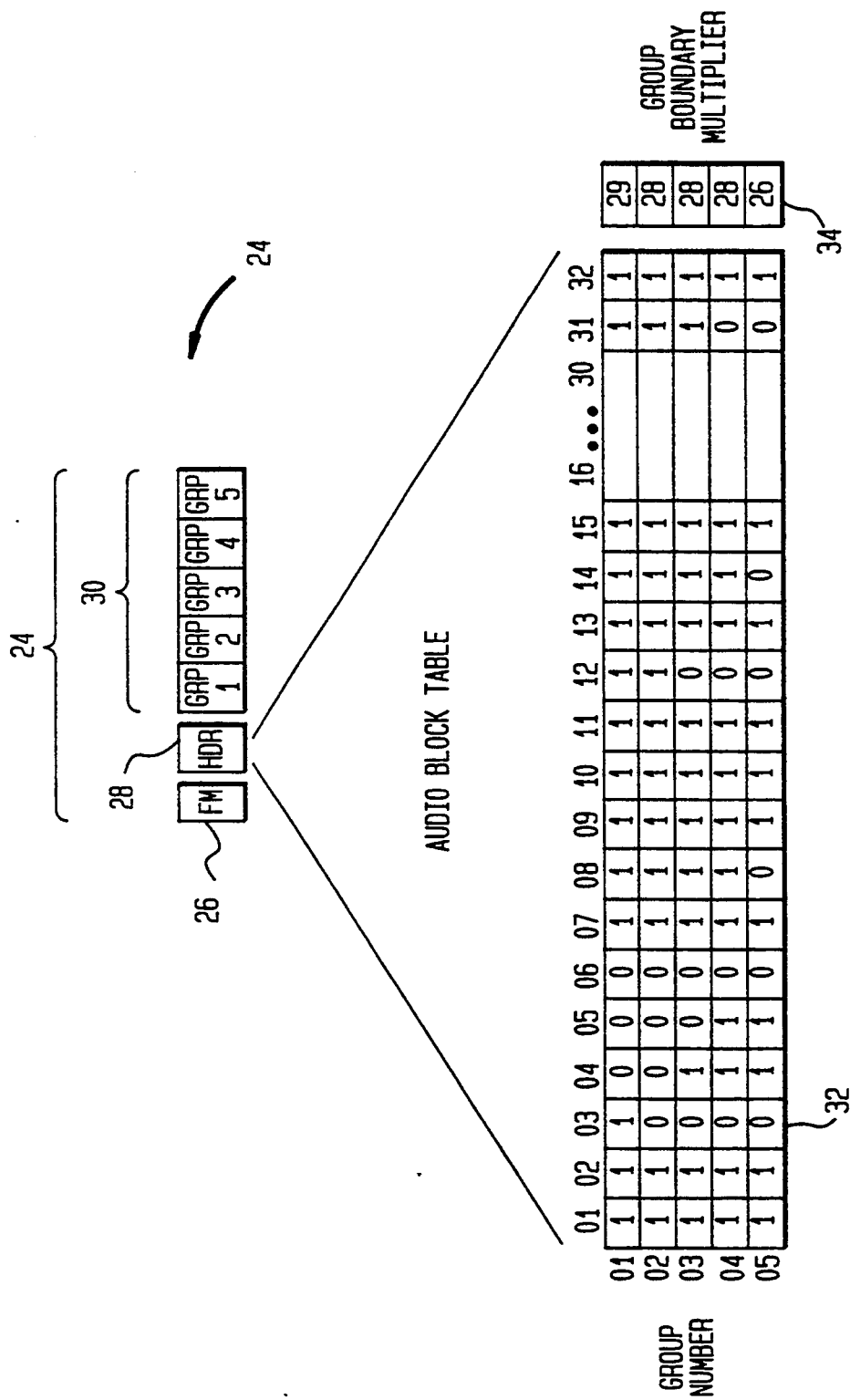

APPARATUS AND METHOD OF RETRIEVING A MESSAGE FROM A DIGITAL AUDIO TAPE

BACKGROUND OF THE INVENTION

Audio loggers are known devices that are used for the purpose of preserving records of voice communication on a medium such as a tape. They have particular use in police stations, hospitals, prisons, brokerage houses and other locations where there is a need to record a message or conversation and the time and date thereof. After recording, the tapes upon which audio is written are stored for archival purposes.

Recently, digital loggers that use digital audio tapes (DATs) have become commercially available. As with any other recording medium used in a logger, or similar device, a scheme should be provided for retrieving a message or conversation in a reliable and fast manner. Unless there is a scheme whereby the presence of messages can be determined in the storage medium, a large portion of the medium must be played to retrieve the message. In particular there is a need to provide a satisfactory manner for finding a next message i.e., the presence of a message following a message to which one is listening or a previous message, i.e., the message prior to the one to which one is listening.

SUMMARY OF THE INVENTION

A novel method for searching a digital tape for the purpose of retrieving audio has been conceived that saves time and is more reliable. The instant invention allows one to not only find a message quickly but allows one to determine the next or prior message depending upon the direction of travel of the tape. Audio is initially stored in a temporary memory in which tables are created to map a profile of the audio. The DAT is divided essentially into two sections, one section referred to as a secondary partition and the second section referred to as the primary partition. Audio is written into the primary partition by a scheme that uses a plurality of frames, each frame including a file mark that divides the tape into time increments, a header and a number of audio groups where the audio is written. The header includes an audio block table that indicates where and whether audio is present on the channels from which audio is received and the groups in which the audio is written. The audio block tables of the headers are created from data stored in the temporary memory and includes every channel. Thus, as a DAT is operated, data will be written into the table that will indicate whether audio has been received and where in the frames the audio is stored. The data from the audio block tables is collected in a DOS system disc as the DAT is recording and used to generate a voice bit map table. After audio is written completely onto the primary partition of a DAT, data will be retrieved from the DOS system disc to generate a voice bit map table in the secondary partition. The voice bit map table stores a history of audio in every audio block table of each frame. In essence, the voice bit map table in the secondary partition is an accumulation of all the data in the audio block tables of all the headers on the DAT.

The method of retrieving a prior message or next next message involves searching the voice bit map table in the secondary partition of the DAT for a selected channel or channels and seeking consecutive "0" bits, which represent no audio being recorded, and consecutive "1" bits, which represent written audio. The scheme for defining the number of consecutive 0 bits and 1 bits will be determined by the operator depending upon the type of use for the voice processing system. In one preferred embodiment, at least two consecutive 0 bits must be present followed by at least four consecutive 1 bits to establish the presence of a message. In the preferred embodiment, four 1 bits would represent 4.8 seconds. By this method, a quick search of the DAT is available that allows one to find a prior or next message on any particular channel or channels. After finding the location of the message in the bit map table of the secondary partition, the message can be retrieved from the primary partition in a quick search by counting the number of file marks and groups.

BRIEF DESCRIPTION OF THE DRAWING

FIG. 2 is a plan view of a digital audio tape (DAT) demonstrating various portions of the DAT;

FIG. 3 is a block diagram representing a frame of the DAT with an exploded view of an audio block table that is stored in the header of such frame;

FIG. 4 is a representation of voice bit map table stored in the secondary partition of the DAT shown in FIG. 1;

FIG. 5 is an example of data from a single channel; and

DETAILED DESCRIPTION OF THE PREFERRED EMBODIMENT

A scheme has been devised whereby audio, i.e. recorded voice, can be retrieved quickly and conveniently from a digital audio tape (DAT). Audio can be either in the form of a conversation or a message that is given by a single party, hereinafter referred to collectively as a message in both the disclosure and accompanying claims. For greater detail, a system in which a DAT records audio is described in copending U.S. patent application Ser. No. 08/100,401 entitled Method and Apparatus for Storing Data on a Digital Audio Tape to which reference can be had.

Figure 1:
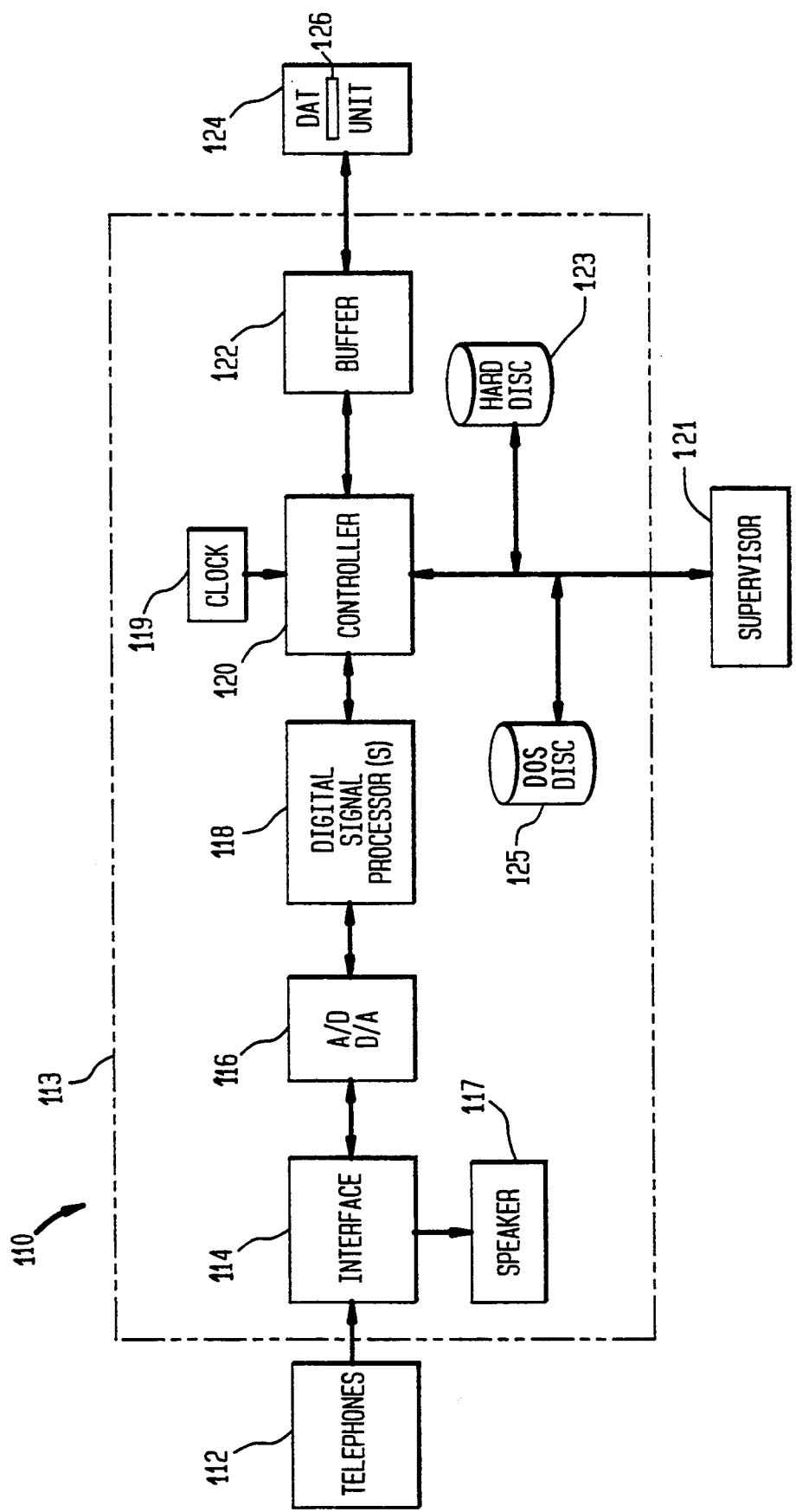
FIG. 1 is a functional block diagram showing a voice processing system with which data can be stored in the primary partition of a DAT in accordance with the instant invention.

With reference to FIG. 1, a digital audio logger system shown generally at 110 in which the instant invention can be performed. A plurality of audio sources 112, such as telephones, is monitored by an interface 114 of a voice processing system 113, which in this instance is a digital logger. Although the invention will be described with telephones, it will be appreciated the invention can be used with other sources of audio such as police radios. The interface 114 is in communication with a speaker 117 and with an analog/digital (A/D), digital/analog convertor (D/A) 116 that will convert analogue signals received from the telephones 112 to digital signals when data is flowing in one direction and digital to analog when data flows in the opposite direction. A digital signal processor 118 is in communication with the converter 116 and performs the function of compressing the digital voice signals by use of a voice compression algorithm as is known in the art. The digital signal processor 118 can be one of many commercially available processors such as a TMS 320C25 processor available from Texas Instruments Inc. The compressed data is received by a controller 120 that arranges the data in a prescribed order and controls the flow of the data. In communication with the controller 120 is a clock 119 that provides the time and date and a buffer 122 that temporarily stores data. The controller 120 is also in communication with a random access storage (RAS) memory device 123, a DOS system disc and a supervisor 121 that provides access to the system 113.

The buffer 122 is in communication with a digital audio tape (DAT) drive 124 that is adapted to receive a DAT 126. The controller 120 communicates with the RAS memory 123 for the purpose of writing data from the buffer 122 into the RAS at the same time data is being written into the DAT. In addition data concerning activity of the channels is written into the DOS system disc 125 to provide data for the generation of tables in the DAT 126 as will be described hereinafter.

With reference now to FIG. 2, a representation of a DAT 126 that incorporates the instant invention is shown generally at 10 and has a beginning of the tape (BOT) 12 and an end of the tape (EOT) 14. Adjacent to the BOT 12 is a secondary partition 16. The secondary partition 16 can include information such as the media format, manufactures identification, product identification in terms of model numer of the recorder that formatted the DAT, the drive vendor, logic unit type, unit software version, an indication whether the tape is an original or a copy, and other information of this type. In addition, the secondary partition 16 stores a voice bit map table which will be described in greater detail with reference to FIGS. 4 and 5. Intermediate the secondary partition 20 and the EOT 14 is the primary partition 18 in which audio is recorded from a number of channels, as for example thirty two channels. Needless to say, the primary partition 18 is by far the largest portion of the DAT 10.

With reference to FIG. 3, where a portion of the primary partition 18 is shown, the primary partition is made up of a number of frames 24, each frame including a file mark 26, a header 28 and a plurality of groups 30, five groups being shown as an example. Each file mark 26 represents six seconds of recording, all channels being recorded during that six seconds. Each group is allocated 1.2 seconds of recording and each group is capable of receiving audio from all channels during its allotted 1.2 seconds. The header 28 has generated therein an audio block table 32 that manifests the recording of data or absence of data in each channel of each group 30. A "0" bit indicates the lack of audio on a particular channel in a group and a "1" bit represents the presence of audio. A group boundary multiplier 34 is also included in the header so as to indicate the number of channels active in the groups. The group boundary multiplier serves as a mechanism for allowing one to quickly find audio in a given frame during playback. Reference can be had to U.S. patent application Ser. No. 08/100,401 supra, for further details relative to the structure and function of a frame. As was stated previously, audio is first stored in the buffer 122 before being written into the DAT 126. As the audio is stored in the buffer 122, the data for the audio block tables are collected and written into the header 28 as audio is transferred from the buffer to the headers and groups 30 of the DAT 126.

With reference now to FIG. 4, a portion of a bit map table is shown generally at 40 that is stored in the secondary partition 16 of the DAT 10. Such a table 40 indicates the voice channel bits 38 and the time 42 at which the recording of each channel took place. This voice bit map table 40 is an accumulation of all the data from all the audio block tables 32 in the primary partition 18 of the DAT. This data is initially stored in the DOS system disc 125 and then written into the bit map table by the digital audio logger 110 in which the DAT 10 is recording. The logger 110, as will be described hereinafter, or another appropriate recording device, has a memory 123 which stores the audio history of data written in the primary partition of the DAT and dumps such history into the bit map table 40 of the secondary partition 16 after the DAT has completed recording. More specifically, all the data from the audio block tables are written into the bit map table 40 in the form as shown in FIG. 4 in the secondary partition 16. This transferring is accomplished automatically by the logger 110. The data is stored in the memory 123 at the same time the data is written into the DAT, i.e., the memory 123 will store the data from the audio block tables from each header 28.

With reference to FIG. 5, a representation of a single channel and the voice activity thereon is shown. Whereas the table in FIG. 4 has a particular channel, such as channel 4, shown vertically, FIG. 5 depicts a single channel horizontally, which channel can be any of the thirty two shown in the voice bit map table in FIG. 4. In searching for a message, predetermined parameters must be established and satisfied. More specifically, a number of "0" bits in sequence must first be demonstrated to show that there is a discontinuance in a conversation and a number of consecutive "1" bits must be found to indicate the presence of a conversation. In one preferred embodiment, the number of consecutive 0 bits is selected as two. This represents 2.4 seconds. This simply means that if there is less than 2.4 seconds between written audio that it is probably the same message whereas if there is more than 2.4 seconds, it is most likely a different message. For the purpose of determining whether a message was recorded, in the first preferred embodiment four or more consecutive 1 bits must be present. Four 1 bits represents 4.8 seconds. In a second preferred embodiment only one 0 bit is required to represent a pause and only one 1 bit is required to show audio. Such a combination of "0"s and "1"s can be tailored as deemed appropriate depending upon the message filtering capability the user wishes when searching.

These schemes are useful when one wishes to find the next message after the one presently being played. The DAT would be driven until the criteria for indicating the next message is met. It will be appreciated that the DAT can travel in the forward direction for finding the next message or the reverse direction for finding the previous message.

The recording by the digital logger can be enabled by one of a number of well known ways such as loop current, voltage sensing, contact closure and VOX. Thus, the scheme for consecutive "0" bits for a pause and "1" bits for audio could be selected based upon the type of enabling scheme used.

Figure 6:
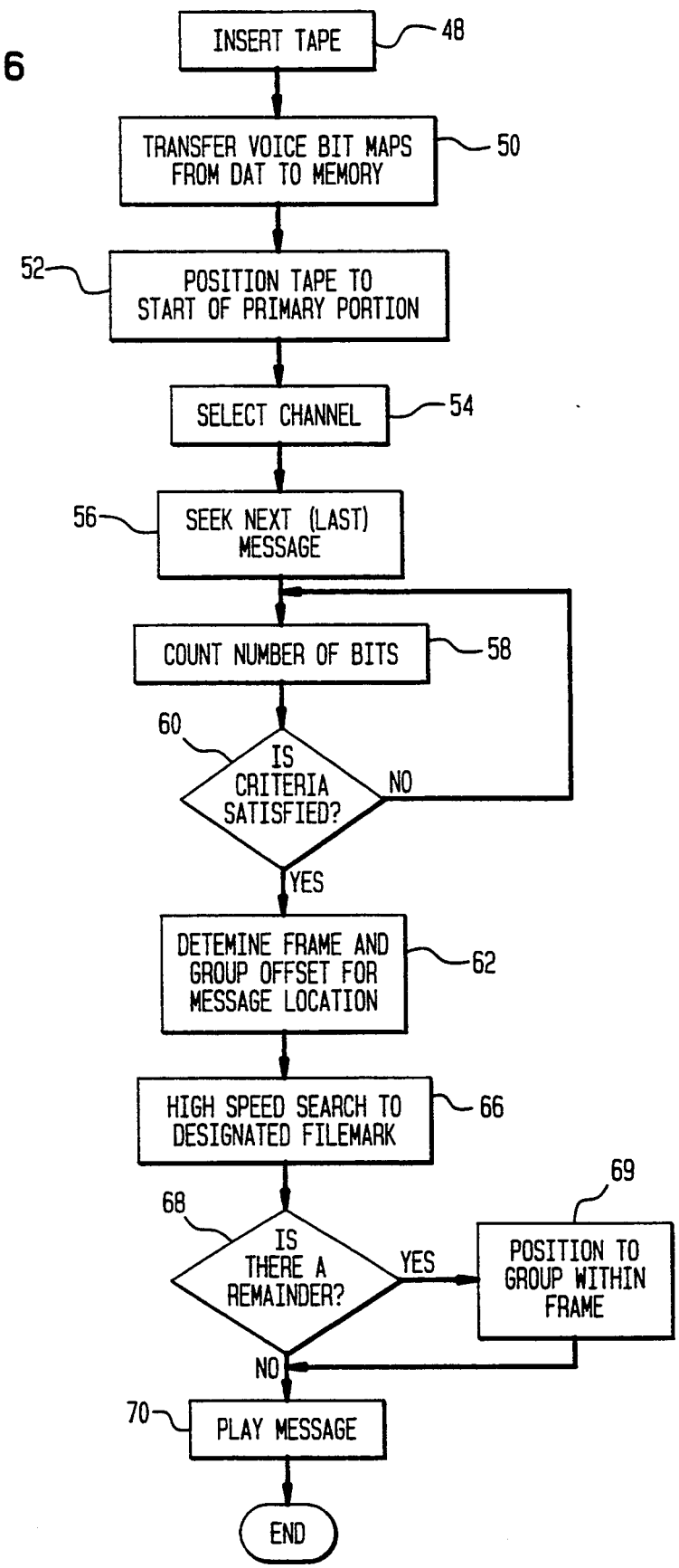
FIG. 6 is a flow chart representing a program of a device for reading the DAT.

A DAT 126 can be placed into the logger 110, or a play back device such as a digital record module, which has a programmed processor that is programmed in a way that is illustrated by the flow chart in FIG. 6. The data in the voice bit map table stored in the secondary partition of the DAT is copied into the memory of the playback device, which memory is preferably random access storage. During the search for the next or previous message, the memory in the playback device is relied upon. Once the position in the voice bit map is found, the translation to the physical location on the tape is made. It will be appreciated that during a search for a next or previous message, one need not be limited to a single channel as all channels can be searched together.

With reference to the flow chart shown in FIG. 6, the method of operation in which a message can be retrieved will be described. A DAT is inserted 48 into a digital logger 110 or other appropriately programmed playback device. It will be assumed that the data in the audio block tables 32 of the primary partition have already been transferred to the bit map table 40 in the secondary partition 16. The data from the bit map table 40 will be transferred 50 from the secondary partition of the DAT into a RAS memory of the playback device in which the DAT is inserted 48. The tape is positioned 52 to the start of the primary partition 18 and a particular channel for which a message is to be searched is selected 54. Alternatively, all the channels can be searched if desired. The tape is then played and the next message is sought 56 or the last message depending upon the direction of tape movement. The number of bits is counted 58 and an inquiry is made whether the criteria for the next message is satisfied 60. As was stated previously, this criteria can be any combination of 0's and 1's that is selected by the operator. If the criteria is not satisfied, there is return, but if the criteria is satisfied, the frame and group for a message location is determined 62. This is accomplished by dividing the number of bits by 5 to determine the group location. It will be recalled that each frame has 5 groups and to find the message that starts with a particular group requires that a frame be divided by 5. The resulting integer and any remainder yields the location of the group in which the message starts. For example, if the message starts at the forty eighth bit, it would start of the third group of the ninth file mark of the DAT. Upon the location being determined 62, a high speed search is made 66 to the file mark location of the tape. Once the tape has been positioned, the question is asked, is there a remainder 68. Assuming that there is no remainder, the message is played 70. If there is a remainder, the recorder is positioned 69 to the group within a frame which equals the remainder and the message is played 70.

Thus, what has been shown and described is a fast and accurate method for finding the next or last message from a DAT based upon a defined criteria for the presence of a message.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A method for searching a digital audio tape (DAT) for a message, the steps comprising:
    a) creating a bit map table that writes a "1" bit for audio and a "0" bit for the absence of audio on a digital audio tape,
    b) storing the bit map table in a memory,
    c) scanning the memory to find a predetermined number of 0 bits in sequence,
    d) scanning the portion of the memory adjacent to the predetermined number of 0 bits,
    e) determining if a predetermined number of 1 bits adjacent to the predetermined number of 0 bits, and
    f) identifying such combination of 0 bits and 1 bits as a message.

2. The method of claim 1 wherein the tape is scanned in the forward direction and the next message is sought.

3. The method of claim wherein the tape is scanned in the reverse direction and a previous message is sought.

4. The method of claim 1 further including the step of reproducing the message.

5. The method of claim 1 wherein the step of scanning for 0 bits includes scanning for two 0 bits in sequence and the step of scanning for 1 bits includes the step of scanning for four 1 bits in sequence.

6. The method of claim 1 further including the step of dividing the DAT into a sequence of frames with each frame having a file mark and at least one group of audio data.

7. The method of claim 1 wherein said step of creating a bit map table includes having a plurality of channels and said step of scanning the DAT includes scanning for a given channel.

8. The method of claim 1 wherein the step of creating a bit map table includes having data for a plurality of channels and said step of scanning the DAT include scanning a plurality of channels.

9. The method of claim 8 further including the step of dividing each channel into a plurality of frames.

10. A method for searching for a message on a digital audio tape (DAT) that has the capability of receiving audio from a plurality of channels when recording in a digital audio logger, the steps comprising:
    a) recording audio in a primary portion of the DAT,
    b) creating a bit map table in a secondary portion of the DAT that identifies the presence and absence of audio on a plurality of channels,
    c) scanning the bit map table to find the presence of a message in the primary portion, and
    d) playing the message.

11. The method of claim 10 wherein the step of creating a bit map table includes storing 0 bits to represent absence of audio storing 1 bits to represent presence of audio.

12. The method of claim 11 wherein said step of creating a bit map includes creating a plurality of frames in the primary portion of the DAT with each frame including a file mark followed by at least one group for recording audio.

13. The method of claim 12 wherein said step of creating at least one group for recording audio in each frame includes a plurality of audio groups.

14. The method of claim 13 further including the steps of creating a header for each frame and creating an audio block table in each header that indicates the presence or absence of audio in the plurality of groups of its respective frame.

15. The method of claim 14 further including transferring the data from the audio block tables in the DAT to a memory, and creating a bit map table in the DAT by transferring the audio block table data into a location on the DAT.

16. The method of claim 15 wherein said frames are in sequence of a first partition of said DAT and said bit map table is stored in a second partition of the DAT.

17. Apparatus for searching a digital audio tape (DAT) for a message, the steps comprising:

a) means creating a bit map table that writes a "1" bit for audio and a "0" bit for the absence of audio in sequence,
b) means for storing the bit map created by said creating means in a memory,
c) means for scanning said memory to find a predetermined number of 0 bits in sequence,
d) means for scanning the portion of said memory adjacent to a predetermined number of 0 bits,
e) means for determining a predetermined number of 1 bits adjacent to the predetermined number of 0 bits, and
f) means for identifying said combination of 0 bits and 1 bits as a message.

18. The apparatus of claim 17 further including means for playing a message identified by said identifying means.

19. The apparatus of claim 17 wherein said combination consists of two 0 bits in sequence and four 1 bits in sequence adjacent to said two 0 bits.

20. Apparatus for searching for a message on a digital audio tape (DAT) that has the capability of receiving audio from a plurality of channels and recording the received audio in a digital audio logger, the steps comprising:
a) means for recording audio in a primary portion of the DAT,
b) means for creating a bit map table in a secondary portion of the DAT that identifies the presence and absence of audio on a plurality of channels,
c) means for scanning the bit map table to find the presence of the next message in the primary portion, and
d) means for playing said message.

* * * * *